United States Patent [19]
Saintot

[11] Patent Number: 6,160,823
[45] Date of Patent: *Dec. 12, 2000

[54] TRANSMISSION SYSTEM FORMED BY AT LEAST A BASE STATION, A MOBILE STATION AND A NODAL STATION AND BASE STATION AND MOBILE STATION SUITABLE FOR USE IN SUCH A SYSTEM

[75] Inventor: Patrice Saintot, Tregastel, France

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/426,296

[22] Filed: Apr. 20, 1995

[30] Foreign Application Priority Data

Apr. 27, 1994 [FR] France .................................. 94 05091

[51] Int. Cl.[7] ...................................................... H04J 3/02
[52] U.S. Cl. .......................................... 370/538; 370/468
[58] Field of Search ................................ 370/95.1, 95.3, 370/79, 80, 81, 82, 84, 99, 110.1, 105.1, 105.2, 105.3, 310, 315, 316, 317, 319, 321, 326, 327, 328, 329, 330, 336, 337, 338, 340, 341, 347, 351, 401, 400, 431, 442, 464, 465, 466, 467, 468, 470, 472, 498, 535, 536, 537, 538, 540, 542, 545, 544; 455/54.1, 56.1, 54.2; 379/59, 60

[56] References Cited

U.S. PATENT DOCUMENTS

| | | | |
|---|---|---|---|
| 4,244,046 | 1/1981 | Brouard et al. | |
| 4,987,570 | 1/1991 | Almond et al. | 370/99 |
| 5,425,031 | 6/1995 | Otsuka | 370/95.3 |
| 5,475,686 | 12/1995 | Bach et al. | 370/84 |
| 5,483,676 | 1/1996 | Mahany et al. | 370/84 |
| 5,490,136 | 2/1996 | Sereno et al. | 370/84 |
| 5,526,346 | 6/1996 | Abiven | 370/99 |
| 5,535,429 | 7/1996 | Bergenlid et al. | |
| 5,555,260 | 9/1996 | Rinnbäck et al. | 370/84 |
| 5,581,575 | 12/1996 | Zehavi et al. | 370/468 |

FOREIGN PATENT DOCUMENTS 0562494  9/1992  European Pat. Off. .

OTHER PUBLICATIONS

"Les Systems De Radiocmmunication Mobile a Ressource Partagees TN10–TN100–TN200" by M. Coudreuse et al., published in Commutation et Transmission No. 2, 1989.

*Primary Examiner*—Huy D. Vu
*Attorney, Agent, or Firm*—Dicran Halajian

[57] ABSTRACT

The system is formed by at least a base station (SR1, SR2, ...) intended to relay information signals having variable rates between a plurality N (N≧1) of mobile stations (M1, M2, ...) linked thereto and a nodal station (K, K', ...), this system comprising a first time-division multiplex link between the N mobile stations and the base station and a second time-division multiplex link (L1, L2, ...) between the base station and the nodal station, the first multiplex link comprising time intervals for containing the information of each mobile station, the second multiplex link comprising time intervals for the information relating to all the mobile stations. There is provided that:
  the time intervals of the first link contain n binary elements assigned according to the information bit stream,
  the time intervals of the second link are organized in frames of M words of n binary elements,
  and M is close to a multiple of N.

27 Claims, 4 Drawing Sheets

TRANSMISSION SYSTEM FORMED BY AT LEAST A BASE STATION, A MOBILE STATION AND A NODAL STATION AND BASE STATION AND MOBILE STATION SUITABLE FOR USE IN SUCH A SYSTEM

BACKGROUND OF THE INVENTION

1. Field of the Invention

The present invention relates to an information transmission system formed by at least a base station intended to relay information signals which have variable rates between a plurality N (N≧1) of mobile stations linked thereto, and a nodal station, which system comprises a first time-division multiplex link between the N mobile stations and the base station and a second time-division multiplex link between the base station and the nodal station, the first multiplex link comprising time intervals for containing the information of each mobile station, the second multiplex link comprising time intervals for the information relating to all the mobile stations.

The present invention likewise relates to a base station and a mobile station suitable for use in such a system.

2. Discussion of the Related Art

An invention of this type finds many applications, especially in radio systems.

A system of the type mentioned in the opening paragraph is known from European Patent Application no. EP 0 562 494 which relates to the DECT (Digital European Cordless Telecommunications) standard. As this prior-art system complies with said standard, the number of channels is fixed and is not adapted to the radio networks in which the utilizations of the channel are to be adapted to the information transmissions according to the needs. An example of such a system is the system described in the article: "LES SYSTEMES DE RADIOCOMMUNICATION MOBILE A RESSOURCE PARTAGEES TN10-TN100-TN200" by M. Coudreuse et al., published in COMMUTATION ET TRANSMISSION No. 2, 1989.

SUMMARY OF THE INVENTION

The invention proposes a system of the type mentioned in the opening paragraph, which allows of proper adaptation as regards traffic handling.

Therefore, such a system is characterized in that the time intervals of the first link contain "n" binary elements assigned each to the information bit stream, the time intervals of the second link are organized in frames of M words of "n" binary elements (bits), and M is close to a multiple of N.

According to an important characteristic feature of the invention, the second Link is a link complying with the standards G703 of the CCITT which define a J64 connection. The TRANSFIX link proposed by FRANCE TELE-COM having a relatively inexpensive tariff also complies with this standard. Other links of this type are also perfectly suitable for the invention.

BRIEF DESCRIPTION OF THE DRAWINGS

The following description accompanied by the appended drawings, all given by way of non-limiting example, will make it better understood how the invention can be realised, wherein.

DETAILED DESCRIPTION OF THE PREFERRED EMBODIMENTS

Figure 1:
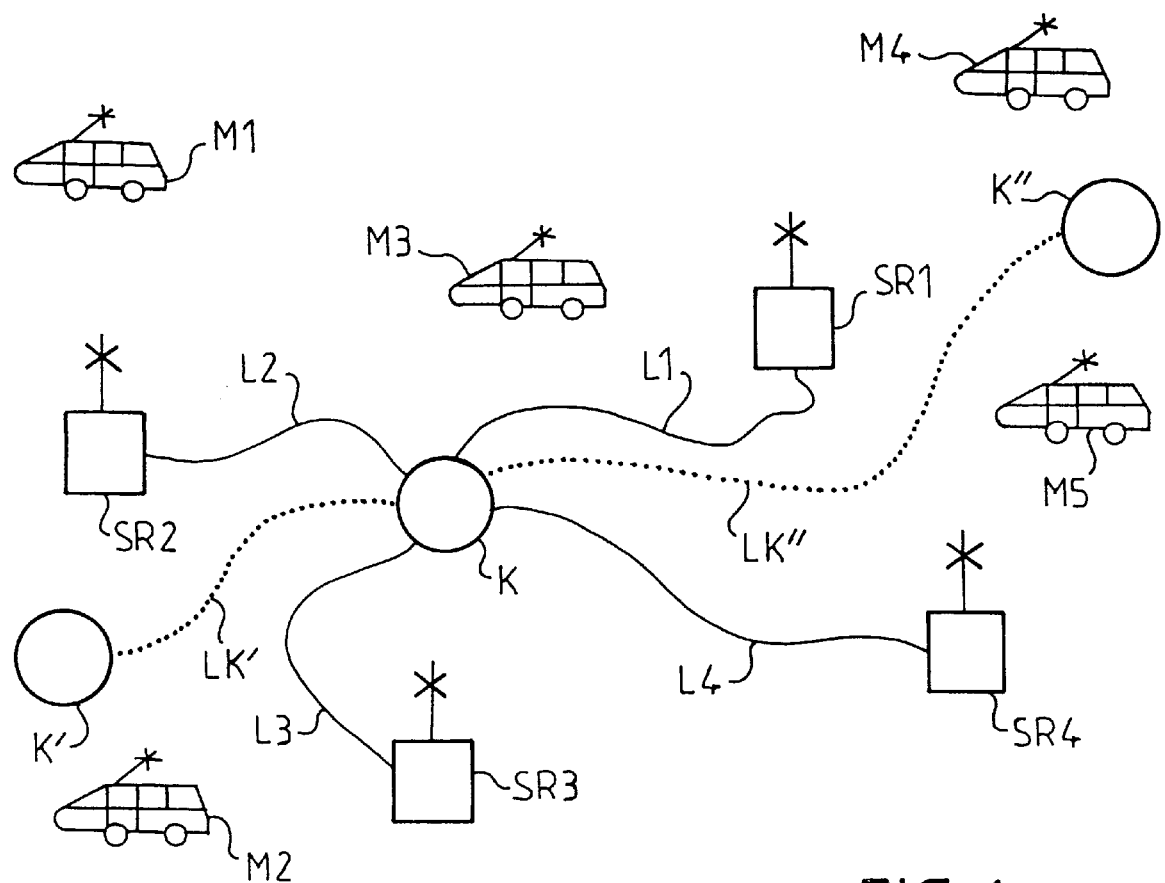
FIG. 1 shows a radio network in which the invention is advantageously used.

FIG. 1 shows a radio network formed by an ensemble of mobile stations M1, M2, M3, M4, M5, . . . They may be on board of automotive vehicles as suggested in the drawing Figure. These mobile stations communicate by radio channel with relay or base stations SR1, SR2, SR3, SR4, . . . which are connected by fixed links L1, L2, L3, L4, . . . respectively, to a first nodal station K which may also be connected to other nodal stations K', K", . . . by links LK', LK", . . . The description of a system of this type may be found in said article of the journal COMMUTATION ET TRANSMISSION.

The fixed links L1, L2, L3, LA, . . . may be links of the national telephone network, which makes it possible to interconnect remote base stations.

At a given instant, mobile stations can be connected to a base station and the information concerning the mobile stations is to be conveyed by one of said fixed links L1, L2, L3, L4, . . . Thus, within the framework of said embodiment, the mobile stations M1, M3, M4 and M5 are connected to the base station SR1 and the fixed link L1 handles their traffic.

Figure 2:
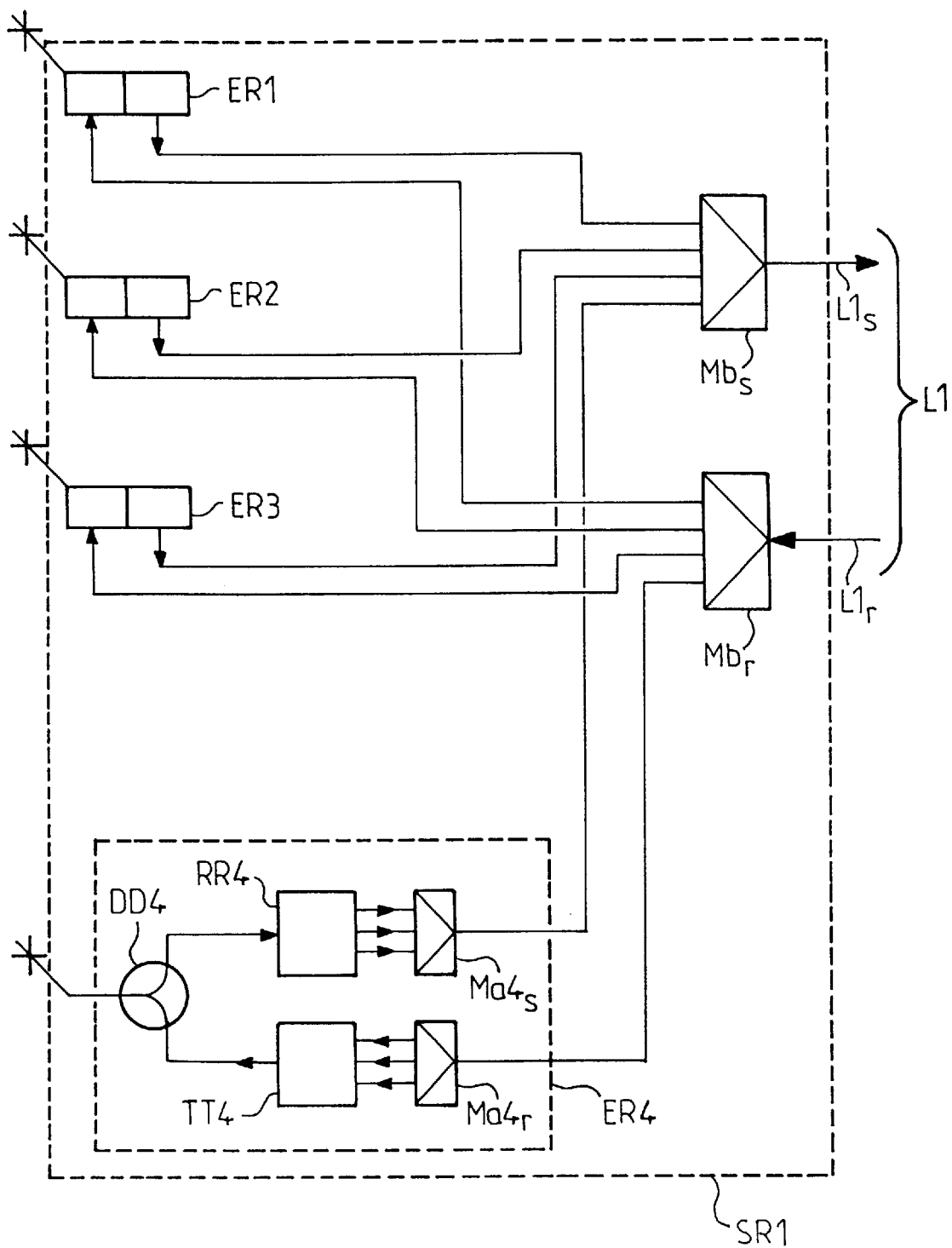
FIG. 2 shows a diagram of a base station.

FIG. 2 shows the diagram of the base station SR1, while the other stations may have the same structure. This station is connected to the nodal station K by a link L1 of the J64 bidirectional type which is indicated by the references $L1_s$ and $L1_r$ for the information sent by the base station and for the information received thereby, respectively. This station comprises four transceiving ensembles ER1, ER2, ER3 and ER4 which thus makes it possible to communicate by radio channel with four mobile stations M1, M3, M4 and M5 at the same time. For establishing the communications with the mobile stations and organizing the management of the network, various service information signals can be used. For example, there may be information signals SVS representing a bit rate of 200 bits/s and which permit of synchronizing the nodal stations and also management information signals MMTS at 1200 bits/s. The speech signals are processed by a codec (not shown in this Figure) which forms part of said mobile stations. Their rate is of the order of 10,000 bits/s (10 kbit/s) or less.

Figure 3:
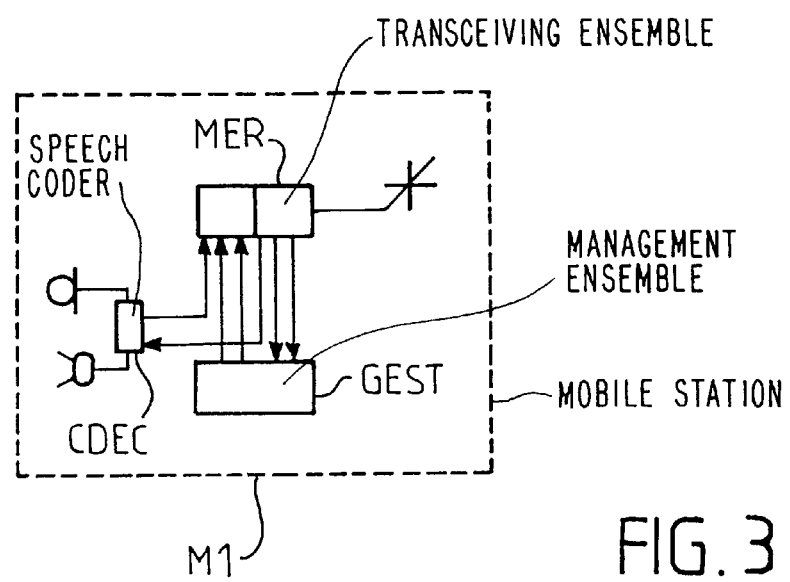
FIG. 3 shows a diagram of a mobile station.

FIG. 3 diagrammatically shows the structure of the mobile station M1, while the structure of the other mobile stations may be identical. The station M1 comprises a transceiving ensemble MER to which is connected a speech coder CDEC which makes it possible to one correspondent to communicate with the base station by telephone. This mobile station also comprises a management ensemble GEST which provides the management, the channel assignment and also its synchronization. This is ensured, for example, by said information signals SVS and MMTS.

Figure 4:
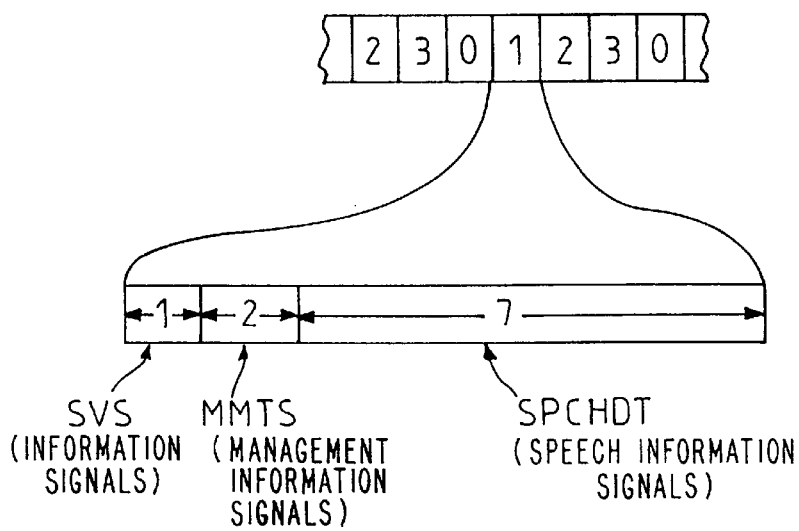
FIG. 4 shows the structure of a first multiplexing packet.

To transmit all these information signals at the rate suitable for them, the invention proposes a spreading of their bits as represented in FIG. 4, performed by a multiplexer Ma4$_s$ for the information signals coming from the four mobile stations. These information signals intended for these stations are reconstituted by a demultiplexer Ma4$_r$. The inputs of the multiplexer Ma4$_s$ are connected to the outputs of a radio receiver RR4 which produces said information signals SVS, MMTS and the speech information signals. Similarly, the demultiplexer Ma4$_r$ applies said information signals SVS, MMTS and the speech information signals to a radio transmitter TT4. An antenna duplexer DD4 makes it possible to use the same antenna for coupling the transmitter TT4 and the receiver RR4.

As this has just been observed, the bits on the output of the multiplexer Ma4$_s$ are spread as a function of the information bit stream. On this output there is a word of 10 bits, one of which is assigned to the information signals SVS, two to the information signals MMTS and seven to the speech information signals SPCHDT (see FIG. 4).

Thus we obtain:

a bit rate of 1.5 kbit/s for the information signals SVS, a bit rate of 3 kbit/s for the information signals MMTS, a bit rate of 10.5 kbit/s for the information signals SPCHDT.

Albeit the multiplexers and demultiplexers have been shown in the form of separate elements, these multiplexing functions may be executed by means of a common data line (bus) whose access is alternately assigned to each transceiving ensemble as a function of the organization of the multiplex to be defined below.

Figure 5:
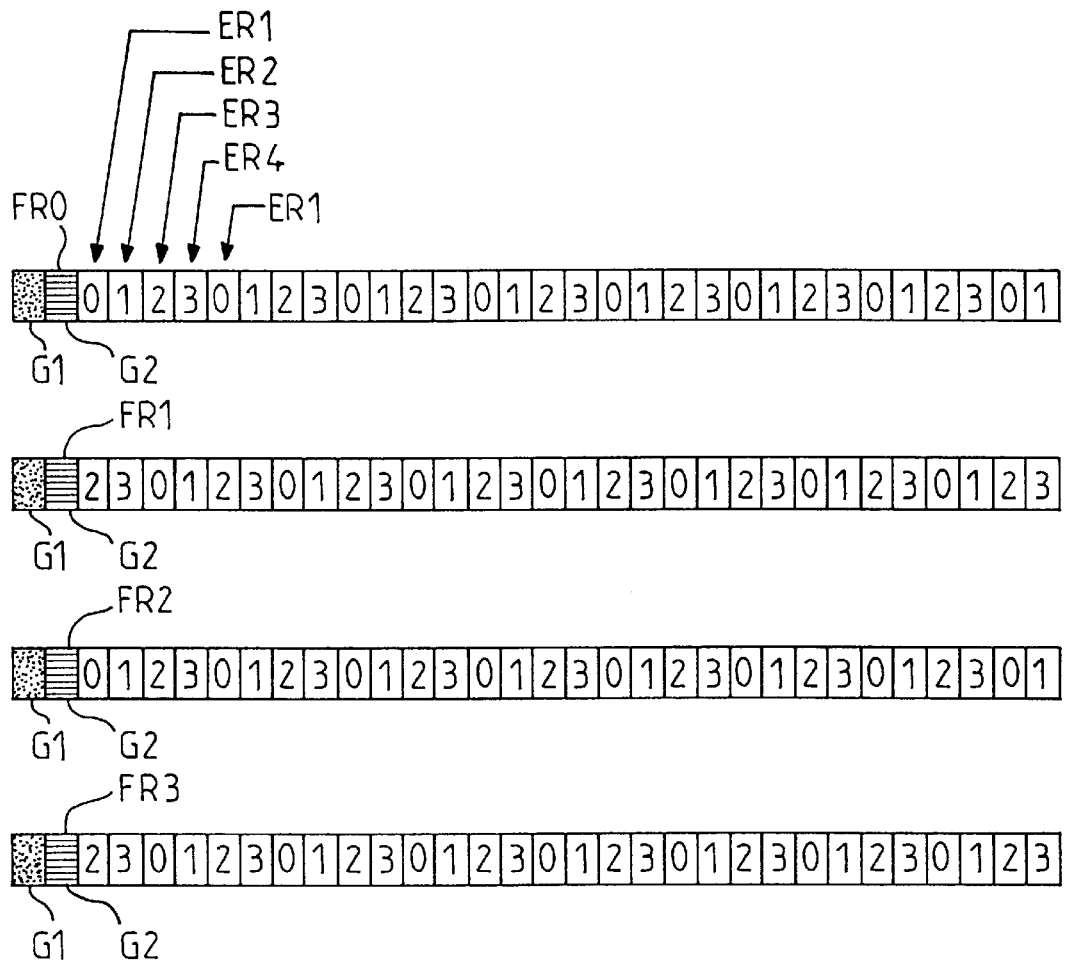
FIG. 5 shows the structure of the time-division multiplexing of the signals transmitted between a base station and a nodal station for four transceiving ensembles.

FIG. 5 shows the organization of the multiplex used for the fixed links. This multiplex preferably utilizes the specifications J64 mentioned above. This multiplex is organized in 120 time intervals for words of 10 bits spread over four frames FR0, FR1, FR2 and FR3 formed each by 32 words of 10 bits. Two words G1 and G2 out of these thirty-two permit of managing this multiplex, which provides that the net rate of this multiplex is 60 kbit/s. The frames FR0, FR1, FR2 and FR3 have each a duration of 5 ms and the multiframe a duration of 20 ms. The time intervals referenced by 0, 1, 2 and 3 in this drawing Figure are assigned to the transceiving ensembles ER1, ER2, ER3 and ER4, respectively.

To show the potential of the invention, there have been represented in the following Table the rates of various marketed codecs which produce a bit sequence in a frame period.

| CODEC | net rate | gross rate for mobile radio channel | frame duration |
|---|---|---|---|
| GSM STANDARD | 13 kbit/s | 22.8 kbit/s | 20 ms |
| 1/2 GSM | 5.7 kbit/s | 11.4 kbit/s | 20 ms |
| TETRA STANDARD | 4.8 kbit/s | 7.2 kbit/s | 30 ms |
| US PFS-106 STD Control system | 4.8 kbit/s | without coding | 30 ms |
| Qualcomm Q4400 | 4 4.8 8 or 9.6 kbit/s | without coding | ? |

The following Table shows how a different spreading can be obtained when a larger number of mobile stations are concerned connected to a base station.

| Number of mobile stations | Rate MMTS | Speech rate | bit recurrence SVS |
|---|---|---|---|
| 4 | 3 kbit/s | 10.5 kbit/s | 0.666 ms |
| 5 | 2.4 kbit/s | 9.6 kbit/s | 0.833 ms |
| 6 | 2 kbit/s | 7 kbit/s | 1 ms |

Figure 6:
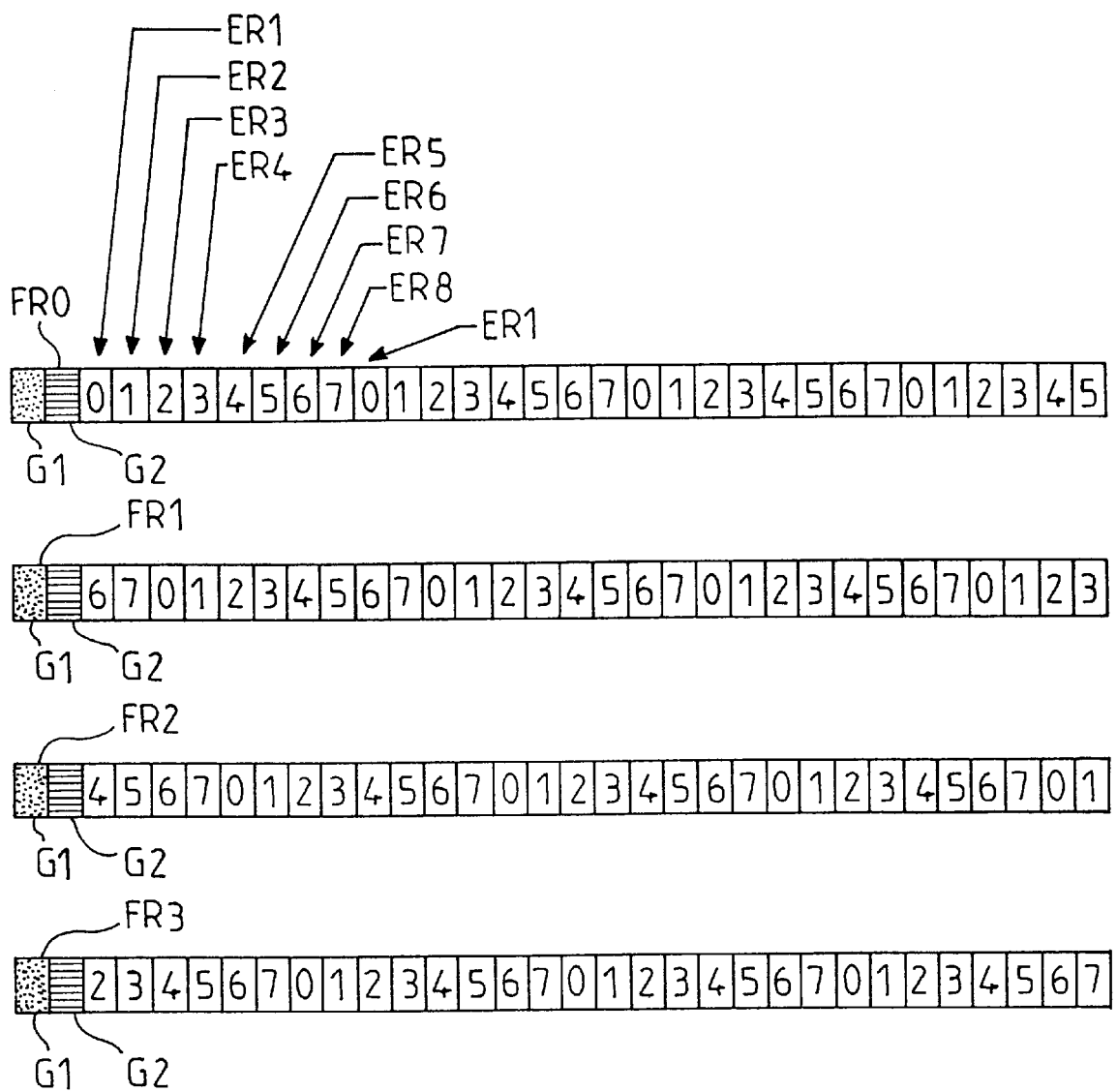
FIG. 6 shows the structure of the time-division multiplexing of the signals transmitted between a base station and a nodal station for eight transceiving ensembles.

Thus the multiframe of 120 intervals shown in FIG. 4 can be divided for these various numbers of mobile stations, because 120 is a multiple of 4, 5 and 6, which normally corresponds to telephone traffic. Certain of these time intervals may be unoccupied, if necessary. If the traffic to be handled requires a low data transmission bit rate, the number of mobile stations may be larger, for example, 8, as this is shown in FIG. 6. This Figure shows well how the 120 time intervals are assigned to the various transceiving ensembles. The frames are assigned one-by-one. Thus, as frame FR0 ends in a time interval "5", the frame FR1 commences, after the time intervals assigned to G1 and G2, at time interval "6" and so on and so forth.

The nodal stations are channel switches as they are used by the public telecommunications offices.

What is claimed is:

1. A transmission system for conveying information generated at a plurality of mobile stations to a nodal station via a base station, comprising:

first means at the base station associated with said plurality of mobile stations for multiplexing information generated by said mobile stations into respective bit streams of words, each of said bit streams of words containing all of the information coming from one mobile station, each word in said respective bit streams having a fixed bit length; and second means at the base station for time division multiplexing the words in said respective bit streams to produce a fixed link to said nodal station, each of said words having a first data type and a second data type, wherein said first data type has a first data rate and said second data type has a second data rate which is different from said first data rate so that each of said words has at least two data types of different rates.

2. A transmission system as in claim 1 wherein the fixed bit length is 10 bits.

3. A transmission system as in claim 1 wherein one time division multiplexed frame of words from the respective bit streams corresponds to a plurality of J64 frames.

4. A transmission system as in claim 3 wherein the plurality of J64 frames contains M words from the respective bit streams, the number of respective bit streams being time division multiplexed into the J64 link is N and M is evenly divisible by N.

5. A transmission system as in claim 4 wherein M is 120.

6. A transmission system as in claim 3 wherein the fixed bit length is 10 bits.

7. A transmission system as in claim 1 wherein one time division multiplexed frame of words from the respective bit streams corresponds to four J64 frames.

8. A transmission system as in claim 7 wherein the fixed bit length is 10 bits.

9. A transmission system as in claim 1 wherein the nodal station is connected to a plurality of base stations via respective fixed link being J64 links.

10. A transmission system as in claim 9 wherein each time division multiplexed frame of words from respective bit streams multiplexed to produce a J64 link corresponds to a plurality of J64 frames.

11. A transmission system as in claim 9 wherein the plurality of J64 frames contains M words from the respective bit streams, the number of respective bit streams being time division multiplexed into the J64 link is N and M is evenly divisible by N.

12. A transmission system as in claim 1 wherein the nodal station is connected to a plurality of base stations via respective J64 links and the number of respective bit streams time division multiplexed to produce respective J64 links varies among the J64 links.

13. A transmission system as in claim 12 wherein each time division multiplexed frame of words from respective bit streams multiplexed to produce a J64 link corresponds to a plurality of J64 frames.

14. A transmission system as in claim 12 wherein the plurality of J64 frames contains M words from the respective bit streams, the number of respective bit streams being time division multiplexed into the J64 link is N and M is evenly divisible by N.

15. A transmission system as in claim 14 wherein M is 120.

16. A transmission system as in claim 12 wherein each time division multiplexed frame of words from respective bit streams multiplexed to produce a J64 link corresponds to four J64 frames.

17. A transmission system as in claim 1, wherein one of said at least two types of data is speech data and another of said at least two types of data is nodal stations synchronization data or management information data.

18. A transmission system as in claim 1, wherein synchronization words are provided at a beginning of each of said respective bit streams, and wherein when a word from one of said plurality of mobile stations is a last word of one of said bit streams, then another word from a next one of said plurality of mobile stations is provided on a next one of said bit streams after said synchronization words of said next bit stream.

19. A transmission system as in claim 1, wherein an outputs of said first means is connected to inputs of said second means.

20. A transmission system for transmitting data coming from N data sources as words having variable data rates into a data multiplex having a fixed data rate stream, the system comprising:
    means for organizing said stream into frames by incorporating synchronization words;
    means for managing a number of time intervals; and
    means for attributing time intervals to each said source in regard to their data rate, wherein each of said words has a first data type and a second data type, said first data type having a first data rate and said second data type having a second data rate which is different from said first data rate so that each of said words has at least two data types of different rates.

21. A transmitting system as claimed in claim 20 wherein the stream complies with the J64 standard.

22. A transmission system as in claim 20, wherein one of said at least two types of data is speech data and another of said at least two types of data is nodal stations synchronization data or management information data.

23. A transmission system as in claim 20, wherein said synchronization words are at a beginning of each of said frames, and said frames have a fixed number of words; and wherein when a word from one of said N data sources is a last word of one of said frames, then another word from a next one of said N data sources is provided on a next one of said frames after said synchronization words of said next frame.

24. A transmission system for transmitting data coming from N data sources providing words having n bits with variable data rates into a data multiplex having a fixed data rate stream, the system comprising:
    means for organizing said stream into frames by incorporating synchronization words;
    means for managing a number of time intervals having n bits; and
    means for attributing time intervals to each said source in regard to their data rate, wherein each of said words has a first data type and a second data type, said first data type having a first data rate and said second data type having a second data rate which is different from said first data rate so that each of said words has at least two data types of different rates.

25. A transmitting system as claimed in claim 24 wherein the stream complies with the J64 standard.

26. A transmission system as in claim 24, wherein one of said at least two types of data is speech data and another of said at least two types of data is nodal stations synchronization data or management information data.

27. A transmission system as in claim 24, wherein said synchronization words are at a beginning of each of said frames, and said frames have a fixed number of words; and wherein when a word from one of said N data sources is a last word of one of said frames, then another word from a next one of said N data sources is provided on a next one of said frames after said synchronization words of said next frame.

* * * * *